US008264336B2

(12) United States Patent
Takafuji

(10) Patent No.: US 8,264,336 B2
(45) Date of Patent: Sep. 11, 2012

(54) VEHICLE-MOUNTED ALARM GENERATING APPARATUS

(75) Inventor: Tetsuya Takafuji, Anjo (JP)

(73) Assignee: Denso Corporation, Kariya (JP)

( * ) Notice: Subject to any disclaimer, the term of this patent is extended or adjusted under 35 U.S.C. 154(b) by 389 days.

(21) Appl. No.: 12/655,641

(22) Filed: Jan. 5, 2010

(65) Prior Publication Data

US 2010/0176970 A1 Jul. 15, 2010

(30) Foreign Application Priority Data

Jan. 9, 2009 (JP) ................................ 2009-003586

(51) Int. Cl.
*B60Q 1/00* (2006.01)

(52) U.S. Cl. ........ 340/435; 340/436; 340/437; 340/438; 340/937; 340/905

(58) Field of Classification Search .......... 340/435–438, 340/937
See application file for complete search history.

(56) References Cited

U.S. PATENT DOCUMENTS

| | | | | |
|---|---|---|---|---|
| 5,638,116 | A * | 6/1997 | Shimoura et al. | 348/118 |
| 5,642,093 | A * | 6/1997 | Kinoshita et al. | 340/439 |
| 5,661,472 | A * | 8/1997 | Koshizawa | 340/901 |
| 5,835,028 | A * | 11/1998 | Bender et al. | 340/937 |
| 5,874,904 | A * | 2/1999 | Hirabayashi et al. | 340/903 |
| 6,091,833 | A * | 7/2000 | Yasui et al. | 382/104 |
| 6,172,600 | B1 * | 1/2001 | Kakinami et al. | 340/435 |
| 6,477,260 | B1 * | 11/2002 | Shimomura | 382/106 |
| 6,813,370 | B1 * | 11/2004 | Arai | 382/104 |
| 6,879,706 | B2 * | 4/2005 | Satoh et al. | 382/104 |
| 6,894,606 | B2 * | 5/2005 | Forbes et al. | 340/435 |
| 6,930,593 | B2 * | 8/2005 | Crawshaw | 340/435 |
| 7,218,207 | B2 * | 5/2007 | Iwano | 340/435 |
| 7,970,529 | B2 * | 6/2011 | Mori et al. | 701/117 |
| 7,986,223 | B2 * | 7/2011 | Au et al. | 340/475 |
| 2004/0042638 | A1 | 3/2004 | Iwano | |

(Continued)

FOREIGN PATENT DOCUMENTS

JP 06-004799 1/1994

(Continued)

OTHER PUBLICATIONS

Office Action dated Oct. 26, 2010 in corresponding Japanese Application No. 2009-003586 with English translation thereof.

*Primary Examiner* — Daniel Wu
*Assistant Examiner* — Son M Tang
(74) *Attorney, Agent, or Firm* — Harness, Dickey & Pierce, PLC

(57) ABSTRACT

The vehicle-mounted alarm generating apparatus includes an extracting section configured to extract a road boundary marking representing a boundary of a lane from an image of a picture of a road surface ahead of a vehicle, a position setting section configured to set a first position and a second position more distant from the vehicle than the first position in accordance with extraction results by the extracting section, a first alarm generating section configured to generate a first alarm when a distance between the vehicle and the first position becomes shorter than a predetermined first distance, and a second alarm generating section configured to generate a second alarm, when a distance between the vehicle and the first position becomes shorter than a predetermined second distance. The configuration of the second alarm is different from that of the first alarm.

14 Claims, 5 Drawing Sheets

U.S. PATENT DOCUMENTS

| | | | | |
|---|---|---|---|---|
| 2008/0186154 | A1* | 8/2008 | Haug | 340/435 |
| 2010/0007480 | A1* | 1/2010 | Uozumi et al. | 340/436 |

FOREIGN PATENT DOCUMENTS

| | | |
|---|---|---|
| JP | 07-065296 | 3/1995 |
| JP | 07-244788 | 9/1995 |
| JP | 09-062968 | 3/1997 |
| JP | 2001-175999 | 6/2001 |
| JP | 2003-338000 | 11/2003 |
| JP | 2004-145852 | 5/2004 |
| JP | 2007-052730 | 3/2007 |
| JP | 2007-193651 | 8/2007 |
| JP | 2008-117054 | 5/2008 |

* cited by examiner

FIG.3A

| | DRIVER'S OPERATION: NOT PERFORMED | DRIVER'S OPERATION : PERFORMED | | |
|---|---|---|---|---|
| | | OPERATION TO STEERING WHEEL OR BRAKE PEDAL OR ACCELERATOR PEDAL | | OPERATION TO TURN SIGNAL LEVER |
| | | OPERATION AMOUNT: SMALL | OPERATION AMOUNT: LARGE | |
| FIRST ALARM | DISPLAY + SOUND | DISPLAY | NOT GENERATED | NOT GENERATED |
| SECOND ALARM | DISPLAY + SOUND + VIBRATION | DISPLAY + SOUND | NOT GENERATED | NOT GENERATED |

FIG.3B

| | | | |
|---|---|---|---|
| FIRST ARARM | SHORT SOUND | SOUND | DISPLAY |
| SECOND ARARM | LONG SOUND | SOUND + VIBRATION | DISPLAY + VIBRATION |

VEHICLE-MOUNTED ALARM GENERATING APPARATUS

CROSS-REFERENCE TO RELATED APPLICATION

This application is related to Japanese Patent Application No. 2009-3586 filed on Jan. 9, 2009, the contents of which are hereby incorporated by reference.

BACKGROUND OF THE INVENTION

1. Field of the Invention

The present invention relates to a vehicle-mounted alarm generating apparatus for alarming a driver of a vehicle when there is a possibility that the vehicle is deviating from the lane in which the vehicle is running.

2. Description of Related Art

There is known a vehicle-mounted apparatus configured to extract a boundary line (a road center line, a road side line, a lane line, for example) on the road on which the vehicle is running from an image of the scene ahead of the vehicle, calculate a time needed for the vehicle crosses the boundary line on the basis of the distance (lateral distance) between the vehicle and the boundary line and the lateral speed of the vehicle, and issue an alarm depending on the calculated time. For example, refer to Japanese Patent No. 3486924.

Incidentally, road markings to show lane boundaries (referred to as "road boundary marking" hereinafter) include not only a boundary line but also a safety zone (zebra zone) as shown in FIG. 6. Furthermore, a boundary line is not limited to a single-line marking. As shown in FIGS. 5A to 5D, a double-line marking or a triple-line marking having a relatively large width may be used as a boundary line. In the following, a road marking having a relatively large width such as a zebra zone, double-line marking or a triple-line marking is referred to as a "wide boundary marking".

The conventional apparatus as disclosed in the above-mentioned patent has problems in that the generation timing of an alarm varies depending on which position of such a wide boundary marking is used as a reference position, and that it is not possible to generate an alarm at an appropriate timing whichever position of the wide boundary marking is used as the reference position, as explained below.

In a case shown in FIG. 6, when a time at which a vehicle reaches a wide boundary marking (see M1 in FIG. 6) is set as an alarm generation timing, no alarm is generated at a time when the vehicle has crossed the wide boundary marking (see M2 in FIG. 6) although the vehicle is about to enter another lane at this time. On the other hand, when a time at which the vehicle runs through the wide boundary marking is set as an alarm generation timing, no alarm is generated at a time when the vehicle reaches the wide boundary marking although the vehicle is about to run off the lane at this time.

It may occur that both of the above times are used as an alarm generation timing. However, in this case, since a similar alarm occurs twice although the degrees of danger are different between these timings, there is a possibility that the driver's attention to the alarm is lowered.

SUMMARY OF THE INVENTION

The present invention provides a vehicle-mounted alarm generating apparatus comprising:

an extracting section configured to extract a road boundary marking representing a boundary of a lane from an image of a picture of a road surface ahead of a vehicle;

a position setting section configured to set a first position and a second position more distant from the vehicle than the first position in accordance with extraction results by the extracting section;

a first alarm generating section configured to generate a first alarm when a distance between the vehicle and the first position becomes shorter than a predetermined first distance; and a second alarm generating section configured to generate a second alarm, when a distance between the vehicle and the second position becomes shorter than a predetermined second distance, configuration of the second alarm being different from a configuration of the first alarm.

According to the present invention, there is provided a vehicle-mounted alarm generating apparatus capable of generating an alarm in an appropriate manner also with respect to a safety zone and a wide boundary marking on a road surface.

Other advantages and features of the invention will become apparent from the following description including the drawings and claims.

BRIEF DESCRIPTION OF THE DRAWINGS

In the accompanying drawings:

FIG. 3A is a listing showing the contents of an alarm configuration table used to determine the contents of first and second alarms generated by the vehicle-mounted alarm generating apparatus FIG. 3B is a diagram showing modifications of the contents of the first and second alarms;

PREFERRED EMBODIMENTS OF THE INVENTION

Figure 1:
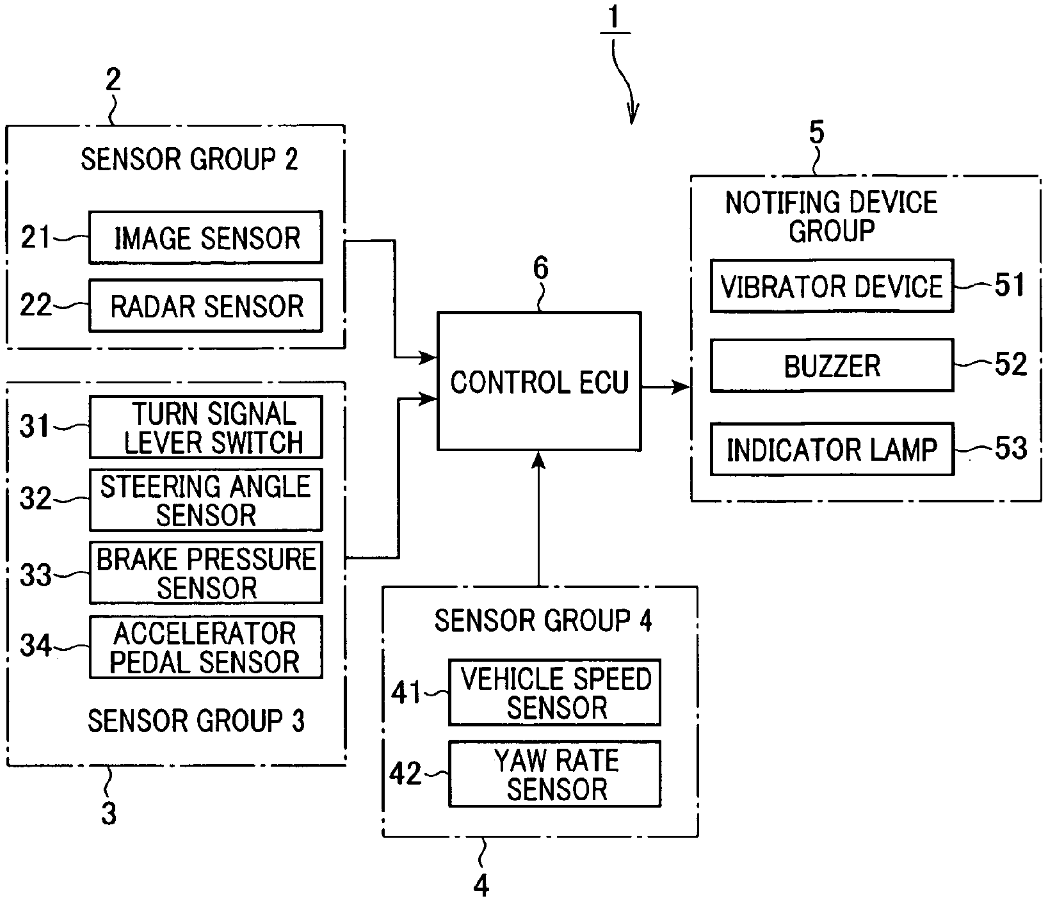
FIG. 1 is a block diagram showing an overall structure of a vehicle-mounted alarm generating apparatus according to an embodiment of the invention.

FIG. 1 is a block diagram showing the overall structure of a vehicle-mounted alarm generating apparatus 1 according to an embodiment of the invention.

The vehicle-mounted alarm generating apparatus 1 includes sensor groups 2, 3 and 4, a notifying device group 5 and a control ECU 6. The sensor group 2 obtains external environmental information to recognize surrounding environment of a vehicle on which the alarm generating apparatus 1 is mounted (may be referred to as "own vehicle" hereinafter). The sensor group 3 obtains driver's operation information showing the operations performed by the driver of the vehicle. The sensor group 4 obtains vehicle behavior information showing the behavior of the vehicle. The notifying device group 5 notifies the driver of various pieces of information including alarm information. The control ECU 6 controls the notifying device group 5 on the basis of information obtained from the sensor groups 2, 3 and 4.

The sensor group 2 includes an image sensor 21 to obtain a picture of the road surface ahead of the vehicle, and a laser sensor 22 to detect the position and size of an obstacle ahead of the vehicle. The external environmental information is constituted of image signals from the image sensor 21 and detection results by the laser sensor 22. The sensors of the sensor group 2 are not limited to an image sensor or a laser sensor. Any sensor capable of detecting the positions or shapes of road markings on the road surface can be used.

The sensor group 3 includes a turn signal lever switch 31 to detect operations on the turn signal lever, a steering angle sensor 32 to detect the steering angle of the steering wheel, a brake pressure sensor 33 to detect the brake pressure caused when the brake pedal is operated, and a accelerator pedal sensor 34 to detect the depressed amount of the accelerator pedal. The driver's operation information is constituted of the on/off output of the turn signal lever switch 31, the steering angle detected by the steering angle sensor 32, and the depression amount of the accelerator pedal detected by the accelerator pedal sensor 34. The sensors of the sensor group 3 are not limited to a turn signal switch, a brake pressure sensor and an accelerator pedal sensor. Any sensor capable of detecting the behavior of the vehicle can be used.

The sensor group 4 includes a vehicle speed sensor 41 to detect the speed of the vehicle, and a yaw rate sensor 42 to detect the turning speed (yaw rate) of the vehicle. The vehicle behavior information is constituted of the vehicle speed detected by the vehicle speed sensor 41 and the yaw rate detected by the yaw rate sensor 42. The sensors of the sensor group 4 are not limited to a vehicle speed sensor and a yaw rate sensor. Any sensor capable of obtaining data necessary to calculate the lateral speed of the vehicle can be used.

The notifying device group 5 includes a vibrator device 51 to apply vibration to the steering wheel as a sensory alarm, a buzzer 52 to generate a warning sound as an audible alarm, and an indicator lamp 53 to display information regarding running conditions of the vehicle as a visual alarm.

Figure 2:
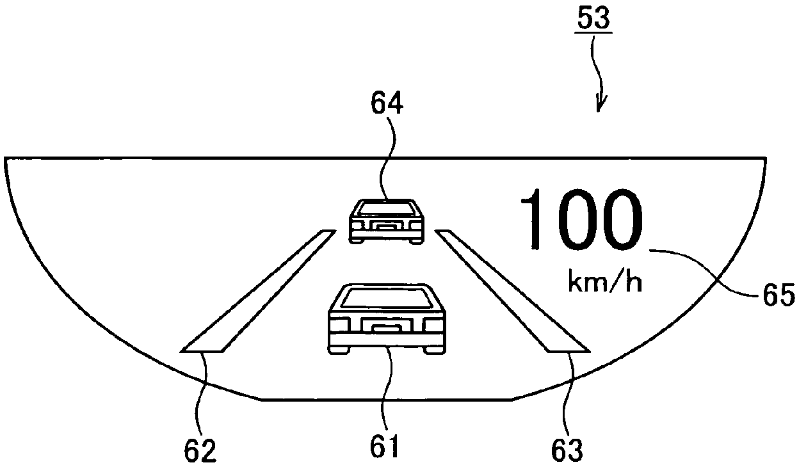
FIG. 2 is a diagram showing an example of a picture on the screen of an indicator lamp displayed by the vehicle-mounted alarm generating apparatus.

As shown in FIG. 2, the indicator lamp 53 is configured to be capable of displaying an own-vehicle mark 61 representing the own vehicle, boundary markings 62 and 63 representing left-side and right side boundaries of the lane in which the own vehicle is running (referred to as "own lane" hereinafter), and a preceding-vehicle mark 64 representing a vehicle running in the own lane ahead of the own vehicle, and displaying the speed of the own vehicle in a display area 65 thereof.

The own-vehicle mark 61 is displayed in a normal color (white or green, for example), the boundary markings 62 and 63 and the preceding-vehicle mark 64 are displayed in one of the normal color and an alarm color (red or yellow, for example)

The own-vehicle mark 61 is displayed continuously. While any road boundary marking is being detected on the basis of the external environmental information, each of the boundary markings 62 and 63 is displayed in the normal color normally. Further, each of the boundary markings 62 and 63 is changed from the normal color to the alarm color or flashed when it is detected that there is a possibility that the own vehicle deviates from the own lane by a later-described alarm process.

The preceding-vehicle mark 64 is displayed in the normal color while any preceding vehicle is detected to be within a predetermined distance range on the basis of the external environmental information. Further, the preceding-vehicle mark 64 is changed from the normal color to the alarm color or flashed when it is detected that there is a possibility of collision between the own vehicle and the preceding vehicle on the basis of the external environmental information, for example, when the own vehicle is approaching the preceding vehicle rapidly.

The control ECU 6 is mainly constituted of a microcomputer including a CPU, ROM and RAM, and configured to perform at least a vehicle-run-off alarm process to cause the notifying device group 5 to generate an alarm regarding vehicle's running off the own lane, and a preceding-vehicle alarm process to cause the notifying device group 5 to generate an alarm regarding a preceding vehicle on the basis of the information received from the sensor groups 2, 3 and 4.

The ROM stores, in addition to the programs of the vehicle-run-off alarm process and the preceding-vehicle alarm process, an alarm configuration table used in performing the vehicle-run-off alarm process and the preceding-vehicle alarm process.

The alarm configuration table is explained below. FIG. 3A is a listing showing the contents of the alarm configuration table.

As shown in FIG. 3A, the alarm configuration table shows the contents of a first alarm which should be issued depending on the driver's operation when the degree of danger to the own vehicle is relatively low, and the contents of a second alarm which should be issued depending on the driver's operation when the degree of danger to the own vehicle is relatively high.

The first alarm includes an indication by the indicator lamp 53, and a warning sound by the buzzer 52. The second alarm includes, in addition to these indication and sound, vibration by the vibrator device 51.

In this embodiment, when there is danger to the own vehicle, the first alarm or the second alarm is issued when the amount of the driver's operation on the steering wheel, brake pedal, or accelerator pedal is small. On the other hand, when the amount of driver's operation is large, neither of the first alarm or the second alarm is issued.

Incidentally, since the turn signal lever is not operated in an analog manner, but is on/off operated, when the turn signal lever is turned on, neither of the first alarm or the second alarm is issued.

Figure 4:
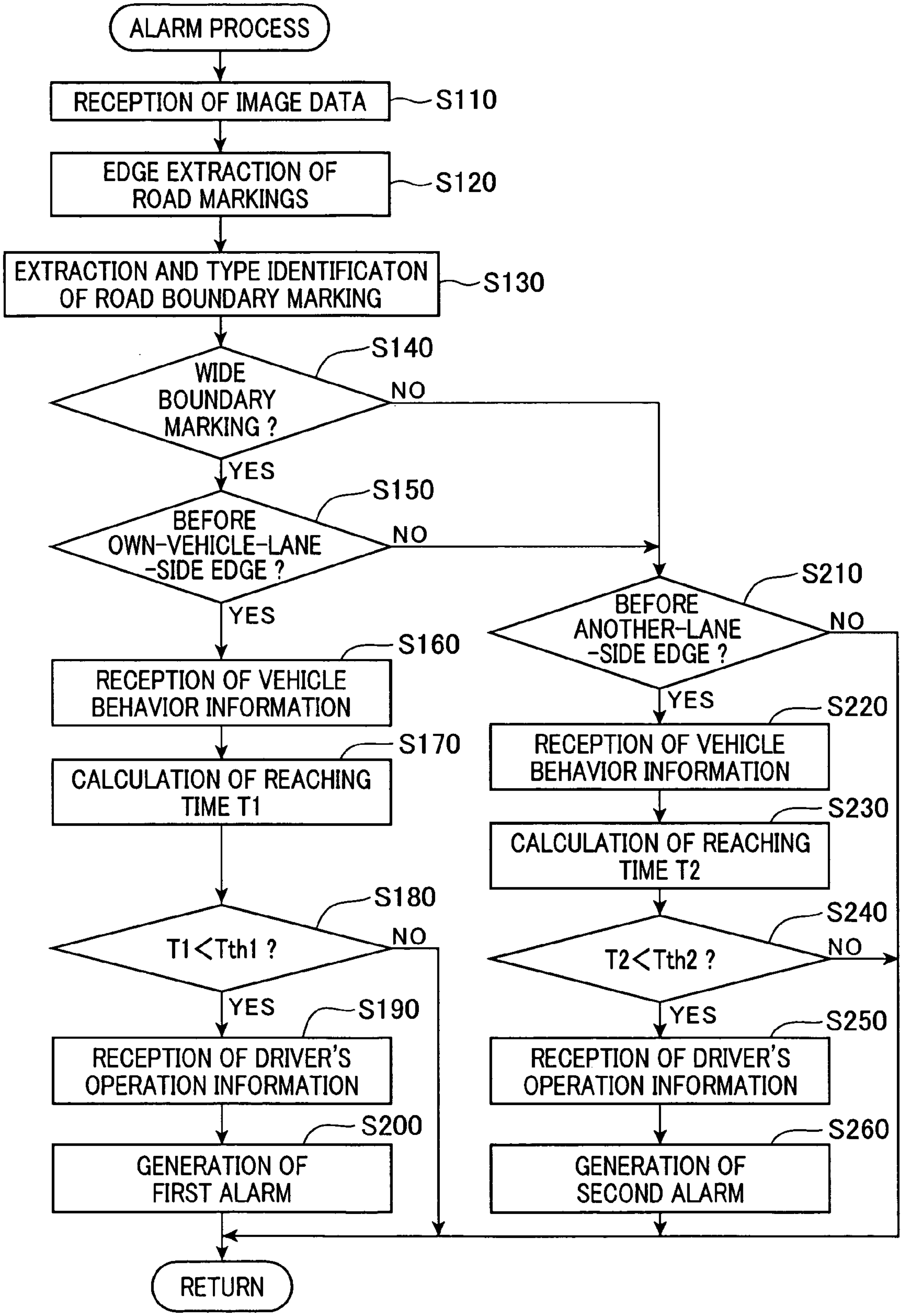
FIG. 4 is a flowchart showing an alarm process performed by the vehicle-mounted alarm generating apparatus.
Figure 5A:
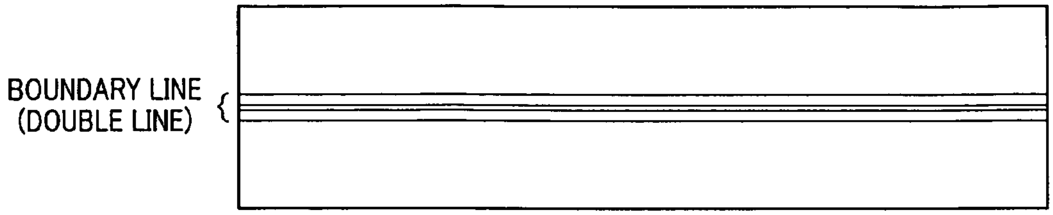
FIGS. 5A to 5D are diagrams showing examples of a wide boundary line on a road.
Figure 5B:
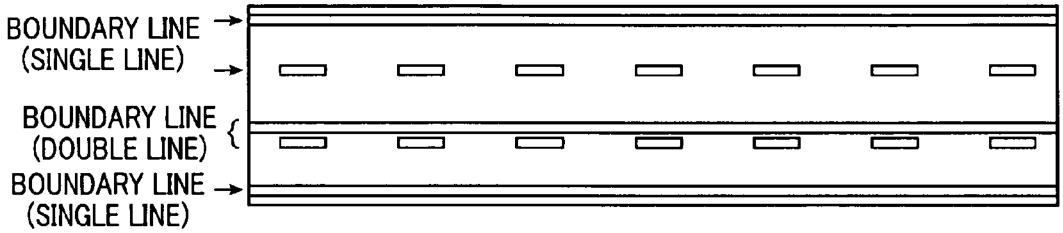
Figure 5C:
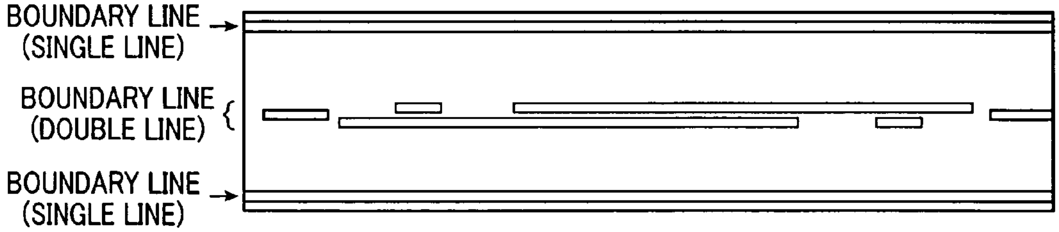
Figure 5D:
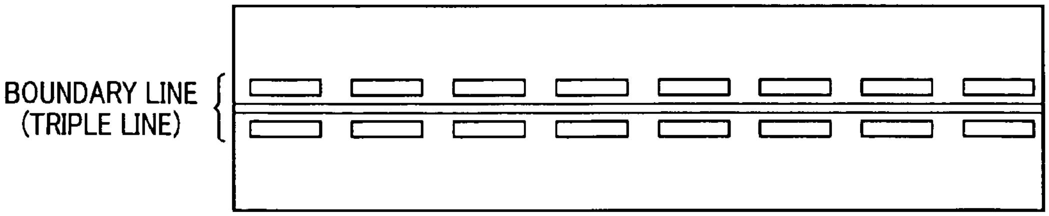

Next, the alarm process performed by the CPU of the control ECU 6 is explained with reference to the flowchart shown in FIG. 4.

The alarm process is activated periodically while the engine is running.

The alarm process begins by receiving the external environmental information (especially, image data taken by the image sensor 21) from the sensor group 2 at step S110.

At subsequent step S120, an area including the road surface is identified on the basis of the image data, and then the edges of road markings painted on the road surface are extracted by extracting parts (pixels) having contrasts higher than a predetermined threshold level within the identified area. Subsequently, a road marking showing lane boundaries (road boundary markings) is extracted on the basis of the extracted edges, while identifying its type.

The types of a road boundary marking includes at least a boundary line constituted of a single-line marking (including a single-dashed-line marking), a boundary line constituted of a double-line marking (including one in which at least one of its two lines is a dashed line), a boundary line constituted of a triple-line marking (including one in which at least one of its three lines is a dashed line), and a safety zone.

Here, the width of a boundary line constituted of a single-line marking is used as a "width threshold", and a boundary line constituted of a double-line or a triple-line marking, and a safety zone each of which has a width wider than the width threshold are referred to as a "wide boundary marking".

Thereafter, it is determined at step S140 whether or not the road boundary marking closest to the own vehicle of the identified road boundary markings is a wide boundary marking. The positional relationship between the own vehicle and each of the identified road boundary markings can be obtained from the imaged data obtained at step S110 or data of the edges extracted at step S120. If the determination result at step 140 is affirmative, the process proceeds to step S150.

At step S150, it is determined whether or not the own vehicle is before the own-vehicle-side edge of the wide boundary marking. If the determination result at step 150 is affirmative, the process proceeds to step S160.

At step S160, the vehicle behavior information (the vehicle speed and yaw rate) is obtained from the sensor group 4. Subsequently, at step S170, the reaching time T1 needed for the own vehicle to reach the own-vehicle-side edge is calculated on the basis of the vehicle behavior information obtained at step S160.

In more detail, at step S170, the lateral speed (the speed approaching the road boundary marking) Vs of the own vehicle is calculated from the vehicle behavior information, the distance R1 from the own vehicle to the own-vehicle-side edge is calculated on the basis of the image data received at step S110, and the reaching time T1 is calculated in accordance with the following equation (1).

$$T1=R1/Vs \quad (1)$$

Next, it is determined whether or not the reaching time T1 is shorter than a first alarm threshold Tth1 at step S180. If the determination result at step S180 is negative, that is, if the possibility that the own vehicle would reach the own-vehicle-side edge is low, the process is terminated. On the other hand, if the determination result at step S180 is positive, that is, if the possibility that the own vehicle would reach the own-vehicle-side edge is high, the process proceeds to step S190.

The first alarm threshold Tth1 is set to a minimum time needed for operation necessary to prevent the own vehicle from reaching the own-vehicle-side edge to be performed.

At step S190, the driver's operation information (the operation state of the turn signal lever, steering angle, brake pressure, depression amount of the accelerator pedal) is obtained from the sensor group 3. Subsequently, at step S200, the first alarm is activated in accordance with the obtained driver' operation information to cause the notifying device group 5 to issue the first alarm, and then the process is terminated.

If the determination result at step S140 or at step S150 is negative, the process proceeds to step S210 to determine whether or not the own vehicle is before the far side edge (opposite side edge) of the road boundary marking (referred to as the "another-lane-side edge" hereinafter). If the determination result at step S210 is negative, since it means that the own vehicle has crossed the another-lane-side edge already, the process is terminated. On the other hand, if the determination result at step S210 is affirmative, the process proceeds to step S220.

At step S220, the vehicle behavior information (the vehicle speed and yaw rate) is obtained from the sensor group 4. At subsequent step S230, the reaching time T2 needed for the own vehicle to reach the another-lane-side edge is calculated on the basis of the obtained vehicle behavior information.

In more detail, at step S220, the lateral speed (the speed approaching the road boundary marking) Vs of the own vehicle is calculated from the vehicle behavior information, the distance R2 from the own vehicle to the another-lane-side edge is calculated on the basis of the image data received at step S110, and the reaching time T2 is calculated in accordance with the following equation (2).

$$T2=R2/Vs \quad (2)$$

Next, it is determined whether or not the reaching time T2 is shorter than a second alarm threshold Tth2 at step S240. If the determination result at step S240 is negative, that is, if the possibility that the own vehicle would reach the another-lane-side edge is low, the process is terminated. On the other hand, if the determination result at step S240 is positive, that is, if the possibility that the own vehicle would reach the another-lane-side edge is high, the process proceeds to step S250.

At step S250, the driver's operation information (the operation state of the turn signal lever, steering angle, brake pressure, depression amount of the accelerator pedal) is obtained from the sensor group 3. Subsequently, at step S260, the second alarm is activated in accordance with the obtained driver's operation information to cause the notifying device group 5 to issue the second alarm, and then the process is terminated.

Incidentally, if different sensors detect the driver's operation differently, the alarm configuration is determined giving high priority to one of the detection results which indicates the largest amount of the driver's operation and on-state of the turn signal lever.

Figure 6:
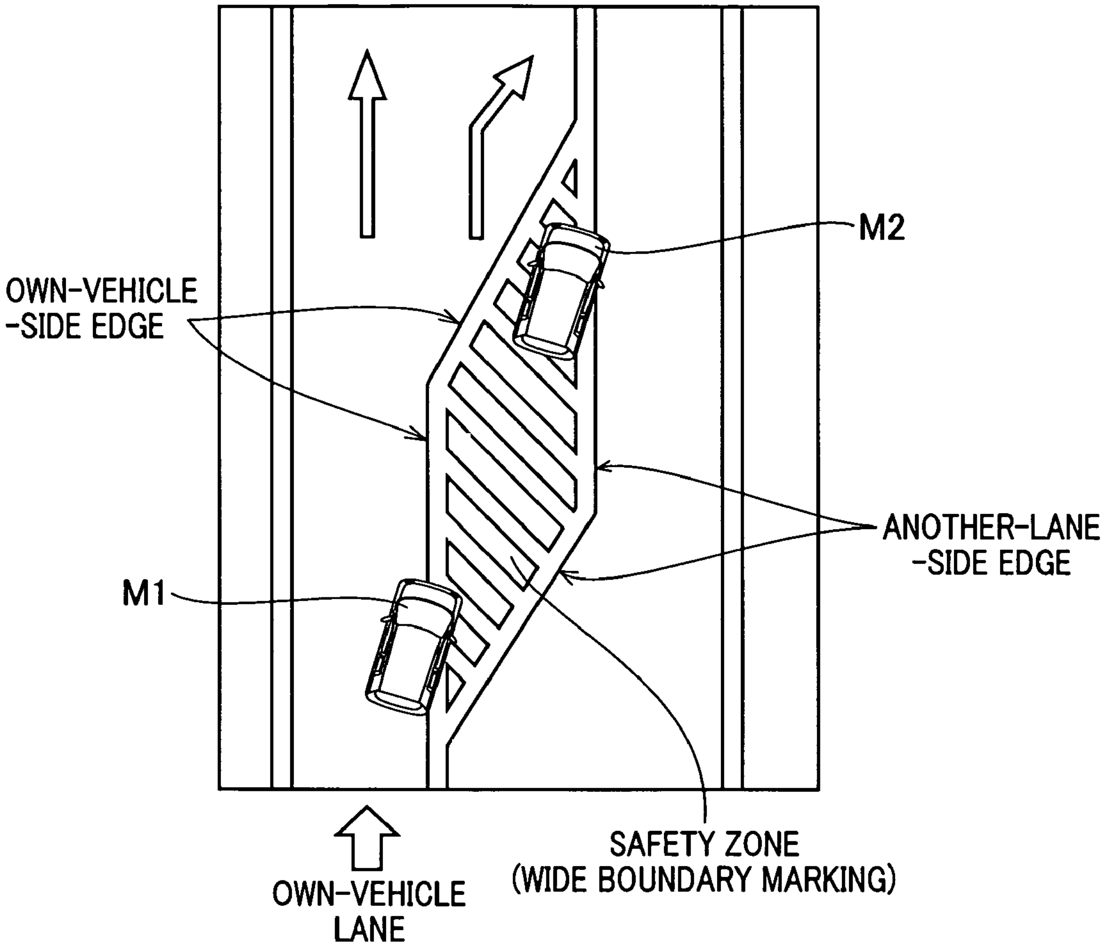
FIG. 6 is diagram explaining problems of a conventional vehicle-mounted alarm generating apparatus.

The vehicle-mounted alarm generating apparatus 1 having the above described structure generates the first alarm if there is a possibility that the own vehicle approaches, reaches or crosses the own-vehicle-side edge of a wide boundary marking (safety zone shown in FIG. 6, for example) when the own vehicle is running along the wide boundary marking. When the own vehicle reaches the own-vehicle-side edge thereafter, if there is a possibility that the own vehicle approaches, reaches or cross the another-lane-side edge, generates the second alarm in order to cause the driver to recognize the danger more strongly than the first alarm.

However, if the vehicle-mounted alarm generating apparatus 1 detects that the driver performs operation to the own vehicle at the time, the vehicle-mounted alarm generating apparatus 1 lowers the alarm degree of the first alarm or the second alarm, or stops generating the first alarm or the second alarm.

When the own vehicle is running along a road boundary marking other than any wide boundary marking, the vehicle-mounted alarm generating apparatus 1 generates only the second alarm when the own vehicle reaches or cross the another-lane-side edge.

The vehicle-mounted alarm generating apparatus 1 of this embodiment provides the following advantages. As explained above, the vehicle-mounted alarm generating apparatus 1 is configured to generate an alarm in the case where there is a possibility that the own vehicle deviates from the own lane (that is, in the case where the reaching time T1 to the own-lane-side edge is shorter than the first alarm threshold Tth1) when the road boundary marking is a wide boundary marking, and also in the case where there is a possibility that the own vehicle passes through the road boundary marking and enters another lane (that is, in the case where the reaching time T2 to the another-lane-side edge is shorter than the second alarm threshold Tth2), the second alarm generated in the latter case being more intensive than the first alarm generated in the former case.

Accordingly, according to the vehicle-mounted alarm generating apparatus 1, it is possible to generate an alarm also for a wide road boundary marking depending on the degree of danger to improve the safety of driving.

Further, according to the vehicle-mounted alarm generating apparatus 1, it is possible to prevent the driver from being disturbed by unnecessary alarms, because the vehicle-mounted alarm generating apparatus 1 is configured to lower the alarm intensity or inhibit generating alarms for each of the first and second alarms depending on the operation of the driver.

Further, according to the vehicle-mounted alarm generating apparatus 1, since the second alarm threshold Tth2 is set to a larger value than the first alarm threshold Tth1 so that an alarm is generated earlier depending on the degree of danger, the safety of driving can be improved.

It is a matter of course that various modifications can be made to the above described embodiment as described below. In the above embodiment, steps S140 to S260 are performed with respect to one of the detected road boundary markings which is the closest to the own vehicle. However, they may be performed with respect to all of the detected road boundary markings.

In the above embodiment, the timing to generate an alarm is determined in accordance with the reaching time calculated on the basis of the vehicle behavior information. However, it may be determined on the basis of only the distance to the detected road boundary markings without using the vehicle behavior information.

FIG. 3B is a diagram showing modifications of the contents of the first and second alarms. As shown in FIG. 3B, the first alarm may include a short alarm sound, and the second alarm may include a long alarm sound. In this case, the first alarm may be an audio alarm or visual alarm, and the second alarm may be an audio alarm with vibration, or visual alarm with vibration.

The first and second alarms may be made different from each other not in the combination of audio and visual alarms, but in the sound pattern, visual display pattern, or vibration patterns.

The present invention can be applicable not only to general vehicles designed to run on a general road, but to any vehicle driven by a driver to run along a lane shown by markings pained on the road surface.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-mounted alarm generating apparatus comprising:

an extracting section configured to extract a road boundary marking representing a boundary of a lane from an image of a picture of a road surface ahead of a vehicle;

a position setting section configured to set a first position of said road boundary marking and a second position of said road boundary marking more distant from said vehicle than said first position in accordance with extraction results by said extracting section;

a first alarm generating section configured to generate a first alarm when a distance between said vehicle and said first position becomes shorter than a predetermined first distance;

a second alarm generating section configured to generate a second alarm, when a distance between said vehicle and said second position becomes shorter than a predetermined second distance, configuration of said second alarm being different from a configuration of said first alarm; and a behavior information acquiring section configured to acquire information representing behavior of said vehicle, said first alarm generating section being configured to calculate a first reaching time needed for said vehicle to reach said first position on the basis of extraction results by said extracting section and said behavior information, and determine that a distance between said vehicle and said first position becomes shorter than said first distance when said calculated first reaching time becomes shorter than a first predetermined threshold, said second alarm generating section being configured to calculate a second reaching time needed for said vehicle to reach said second position on the basis of extraction results by said extracting section and said behavior information, and determine that a distance between said vehicle and said second position becomes shorter than said second distance when said calculated second reaching time becomes shorter than a second predetermined threshold.

2. The vehicle-mounted alarm generating apparatus according to claim 1, wherein each of said first and second alarms includes at least one of or a combination of an audible alarm, a visual alarm and a sensory alarm.

3. The vehicle-mounted alarm generating apparatus according to claim 1, further comprising an operation detecting section configured to detect operations to said vehicle performed by a driver of said vehicle, and an alarm configuration setting section to variably set configuration of each of said first and second alarms in accordance with detection results by said operation detecting section.

4. The vehicle-mounted alarm generating apparatus according to claim 1, wherein said operation detecting section is configured to detect operations of at least one of a steering wheel, a brake pedal, an accelerator pedal and a turn signal lever of said vehicle.

5. The vehicle-mounted alarm generating apparatus according to claim 1, wherein said first position is set at one edge of said extracted road boundary marking on a side of said vehicle, and said second position is set at an other edge of said extracted road boundary marking on an opposite side of said extracted road boundary marking.

6. A vehicle-mounted alarm generating apparatus comprising:

an extracting section configured to extract a road boundary marking representing a boundary of a lane from an image of a picture of a road surface ahead of a vehicle:

a position setting section configured to set a first position of said road boundary marking and a second position of said road boundary marking more distant from said vehicle than said first position in accordance with extraction results by said extracting section;

a first alarm generating section configured to generate a first alarm when a distance between said vehicle and said first position becomes shorter than a predetermined first distance;

a second alarm generating section configured to generate a second alarm, when a distance between said vehicle and said second position becomes shorter than a predetermined second distance, configuration of said second alarm being different from a configuration of said first alarm; and a control section configured to cause said first alarm generating section to operate when said vehicle is before said first position, and cause said second alarm generating section to operate when said vehicle is between said first position and said second position in a case where a distance between said first and second positions is wider than a predetermined threshold width.

7. The vehicle-mounted alarm generating apparatus according to claim 6, wherein said control section causes one of said first and second alarm generating section to operate when a distance between said first and second positions is shorter than said threshold width.

8. The vehicle-mounted alarm generating apparatus according to claim 6, wherein each of said first and second alarms includes at least one of or a combination of an audible alarm, a visual alarm and a sensory alarm.

9. The vehicle-mounted alarm generating apparatus according to claim 6, further comprising an operation detecting section configured to detect operations to said vehicle performed by a driver of said vehicle, and an alarm configuration setting section to variably set configuration of each of said first and second alarms in accordance with detection results by said operation detecting section.

10. The vehicle-mounted alarm generating apparatus according to claim 6, wherein said operation detecting section is configured to detect operations of at least one of a steering wheel, a brake pedal, an accelerator pedal and a turn signal lever of said vehicle.

11. A vehicle-mounted alarm generating apparatus comprising:

an extracting section configured to extract a road boundary marking representing a boundary of a lane from an image of a picture of a road surface ahead of a vehicle;

a position setting section configured to set a first position of said road boundary marking and a second position of said road boundary marking more distant from said vehicle than said first position in accordance with extraction results by said extracting section;

a first alarm generating section configured to generate a first alarm when a distance between said vehicle and said first position becomes shorter than a predetermined first distance; and a second alarm generating section configured to generate a second alarm, when a distance between said vehicle and said second position becomes shorter than a predetermined second distance, configuration of said second alarm being different from a configuration of said first alarm;

wherein said first position is set at one edge of said extracted road boundary marking on a side of said vehicle, and said second position is set at an other edge of said extracted road boundary marking on an opposite side of said extracted road boundary marking.

12. The vehicle-mounted alarm generating apparatus according to claim 11, wherein each of said first and second alarms includes at least one of or a combination of an audible alarm, a visual alarm and a sensory alarm.

13. The vehicle-mounted alarm generating apparatus according to claim 11, further comprising an operation detecting section configured to detect operations to said vehicle performed by a driver of said vehicle, and an alarm configuration setting section to variably set configuration of each of said first and second alarms in accordance with detection results by said operation detecting section.

14. The vehicle-mounted alarm generating apparatus according to claim 11, wherein said operation detecting section is configured to detect operations of at least one of a steering wheel, a brake pedal, an accelerator pedal and a turn signal lever of said vehicle.

* * * * *